US011299266B2

(12) United States Patent
Hicks et al.

(10) Patent No.: US 11,299,266 B2
(45) Date of Patent: Apr. 12, 2022

(54) WING FOR AN AIRCRAFT

(71) Applicant: Gulfstream Aerospace Corporation, Savannah, GA (US)

(72) Inventors: George Hicks, Savannah, GA (US); Donald Howe, Savannah, GA (US); Gregory Howe, Savannah, GA (US); Joe Gavin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 605 days.

(21) Appl. No.: 15/793,682

(22) Filed: Oct. 25, 2017

(65) Prior Publication Data

US 2019/0118931 A1    Apr. 25, 2019

(51) Int. Cl.
*B64C 30/00* (2006.01)
*B64C 23/06* (2006.01)
*B64C 3/10* (2006.01)

(52) U.S. Cl.
CPC ............. *B64C 30/00* (2013.01); *B64C 3/10* (2013.01); *B64C 23/06* (2013.01)

(58) Field of Classification Search
CPC ............ B64C 3/10; B64C 30/00; B64C 23/06
See application file for complete search history.

(56) References Cited

U.S. PATENT DOCUMENTS

| 3,206,146 A | | 9/1965 | Toms | |
|---|---|---|---|---|
| 4,139,172 A | | 2/1979 | Miller et al. | |
| 4,336,913 A | * | 6/1982 | Hall | B64C 39/08 244/45 R |
| 4,469,294 A | * | 9/1984 | Clifton | B64C 29/0025 244/10 |
| 4,598,886 A | * | 7/1986 | Friebel | B64C 23/04 244/15 |
| 5,538,201 A | * | 7/1996 | Gerhardt | B64C 3/10 244/204 |
| 5,961,068 A | * | 10/1999 | Wainfan | B64C 3/10 244/130 |
| 6,138,957 A | * | 10/2000 | Nastasi | B64C 3/10 244/219 |

(Continued)

FOREIGN PATENT DOCUMENTS

DE    102014201040 A1    7/2015

OTHER PUBLICATIONS

Wikipedia, English Electiic Lightning Aircraft, https://en.wikipedia.org/wiki/English_Electric_Lightning.
Wikipedia, Short SB5, https://en.wikipedia.org/wiki/Short_SB.5.

*Primary Examiner* — Philip J Bonzell
*Assistant Examiner* — Michael B. Kreiner
(74) *Attorney, Agent, or Firm* — LKGlobal | Lorenz & Kopf, LLP

(57) ABSTRACT

A wing for an aircraft includes, but is not limited to, a wing body having a wingtip, a leading-edge, and a trailing edge. The wingtip comprises an outboard-most portion of the wing body. The leading-edge is disposed along a forward portion of the wing body and is configured to cause a vortex to extend off the trailing edge at a location inboard of the wingtip when the aircraft is flown sub-sonically at a predetermined angle of attack. The trailing edge is disposed along an aft portion of the wing body and has an aft-most region disposed inboard of the wingtip at a position that corresponds with the location where the vortex extends off the trailing edge.

20 Claims, 9 Drawing Sheets

(56) References Cited

U.S. PATENT DOCUMENTS

| | | | | |
|---|---|---|---|---|
| 7,216,830 | B2 * | 5/2007 | Quayle | ............... B64C 3/16 244/15 |
| 7,311,287 | B2 * | 12/2007 | Morgenstern | ........ B64C 30/00 244/1 R |
| 8,473,254 | B2 * | 6/2013 | Morgenstern | ...... B64C 1/0009 703/1 |
| 9,446,839 | B2 * | 9/2016 | Freund | ................ B64C 3/38 |
| 2004/0022635 | A1 | 2/2004 | Vanmoor | |
| 2005/0067526 | A1 | 3/2005 | Quayle et al. | |
| 2009/0173838 | A1 | 7/2009 | Grill et al. | |

\* cited by examiner $\alpha = 0$

WING FOR AN AIRCRAFT

TECHNICAL FIELD

The present invention generally relates to aircraft and more particularly relates to a wing for an aircraft.

BACKGROUND

Some aircraft wing configurations may perform well under certain flight conditions or during certain phases of flight but then perform in a manner that is undesirable under other flight conditions or during other phases of flight. For example, a wing on a supersonic aircraft that is designed to minimize wave drag or to minimize sonic boom during supersonic flight may provide stability at supersonic speeds but may cause the aircraft to pitch up during sub-sonic flight when flown at a relatively high angle of attack. As used herein, the term "relatively high" angle(s) of attack refers to an angle of attack that is higher than the angle of attack at which the aircraft is designed to cruise. In some embodiments, "relatively high" angles of attack fall within the range of approximately ten degrees to approximately twenty degrees. Such a tendency would be undesirable during the takeoff and landing phases of a flight when the aircraft will be traveling sub-sonically at higher angles of attack than during other phases of flight.

Accordingly, it is desirable to provide a wing that does not exhibit the above described tendency to pitch up. Furthermore, other desirable features and characteristics will become apparent from the subsequent summary and detailed description and the appended claims, taken in conjunction with the accompanying drawings and the foregoing technical field and background.

BRIEF SUMMARY

Various embodiments of a wing for an aircraft are disclosed herein.

In a first non-limiting embodiment, the wing includes, but is not limited to, a wing body having a wingtip, a leading-edge, and a trailing edge. The wingtip comprises an outboard-most portion of the wing body. The leading-edge is disposed along a forward portion of the wing body and is configured to cause a vortex to extend off the trailing edge at a location inboard of the wingtip when the aircraft is flown sub-sonically at a predetermined angle of attack. The trailing edge is disposed along an aft portion of the wing body and has an aft-most region disposed inboard of the wingtip at a position that corresponds with the location inboard of the wingtip.

In another non-limiting embodiment, the wing includes, but is not limited to, a wing body having a wingtip, a leading-edge, and a trailing edge. The wingtip comprises an outboard-most portion of the wing. The leading-edge is disposed along a forward portion of the wing body and is configured such that when the aircraft is flown sub-sonically at a first predetermined angle of attack, a vortex will form at the leading-edge and create a low pressure region at a first location on an upper surface of the wing, and when the aircraft is flown sub-sonically at a second predetermined angle of attack greater than the first predetermined angle of attack, the vortex will be repositioned causing the low pressure region to move to a second location on the upper surface of the wing, the second location being aft and inboard of the first location. The trailing edge is disposed along an aft portion of the wing body and has an aft-most region disposed inboard of the wingtip and at a position that corresponds with the second location.

In still another non-limiting embodiment, the wing includes, but is not limited to a wing body having a wingtip, a leading-edge, and a trailing edge. The wingtip comprises an outboard-most portion of the wing body. The leading-edge is disposed along a forward portion of the wing body and is configured such that when the aircraft is flown sub-sonically at a first predetermined angle of attack, a vortex will form at the leading-edge. The vortex has a vortex axis that extends outboard in a first direction that is substantially aligned with the leading-edge when the aircraft is flown at the first predetermined angle of attack. The vortex axis extends outboard in a second direction that is oblique with respect to the leading-edge and aft thereof when the aircraft is flown at a second predetermined angle of attack. The second predetermined angle of attack is greater than the first predetermined angle of attack. The trailing edge is disposed along an aft portion of the wing body and has an aft-most region disposed inboard of the wingtip and at a position that corresponds with the vortex axis when the aircraft is flown at the second predetermined angle of attack.

BRIEF DESCRIPTION OF THE DRAWINGS

The present invention will hereinafter be described in conjunction with the following drawing figures, wherein like numerals denote like elements.

DETAILED DESCRIPTION

Figure 1:
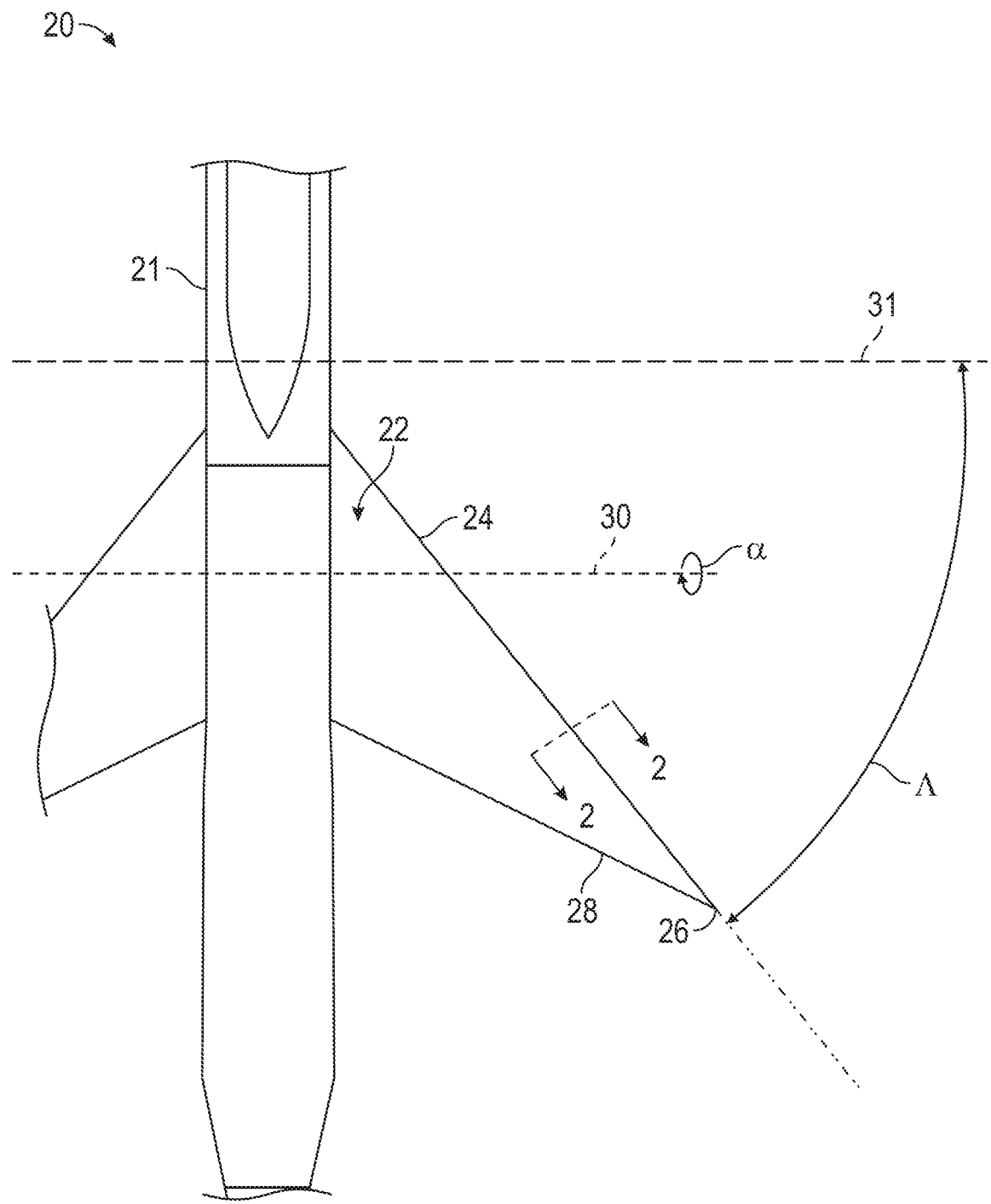
FIG. 1 is a fragmentary schematic overhead view illustrating an aircraft configured with a prior art wing.

The following detailed description is merely exemplary in nature and is not intended to limit the invention or the application and uses of the invention. Furthermore, there is no intention to be bound by any theory presented in the preceding background or the following detailed description.

An improved wing for use on an aircraft is disclosed herein. In a non-limiting embodiment, the wing includes a trailing edge having a region that extends aft beyond the aft end of the wingtip. In other words, unlike conventional aircraft where the wingtip is the aft-most portion of the wing, the present disclosure teaches that the aft-most region of the wing is located on the wing's trailing edge, inboard of the wing tip. In a non-limiting embodiment, the location of the aft-most region will correspond with a location on the trailing edge where a leading-edge vortex extends past the aft end of the trailing edge when the aircraft is flown sub-sonically at a predetermined design angle of attack. In a non-limiting embodiment, the predetermined design angle of attack may correspond with the angle of attack flown by the aircraft during a takeoff or landing phase of flight.

The leading-edge vortex generates a region of low pressure directly beneath the leading-edge vortex that acts on the upper surface of the wing (i.e., suction that can augment lift). As the angle of attack of the aircraft increases, the leading-edge vortex detaches from the leading-edge and swings aft along the wing's upper surface. The region of low pressure moves aft together with the leading-edge vortex. On an aircraft configured with a conventional wing (i.e., a wing where the wingtip is the aft-most portion of the wing), when the vortex swings aft along the wing's upper surface, the vortex falls off of (i.e., extends past) the trailing edge of the wing. When this happens, the portion of the vortex that extends past the wing's trailing edge is unable to exert any suction on the upper surface of the wing.

By forming a wing body that includes a portion located aft and inboard of the wingtip, additional wing surface area is positioned in the path of the leading-edge vortex as it swings aft. This allows the wing to exploit the low pressure region beneath the vortex that would otherwise extend beyond the trailing edge of the wing. By placing this additional wing portion under the vortex as it extends aft of the wing at a location inboard of the wingtip, the wing of the present disclosure is able to generate a substantial amount of upwardly directed force.

When this upwardly directed force acts on a portion of the aircraft that is positioned aft of the aircraft's center of gravity, this force generates a nose-down pitching moment on the aircraft. A nose-down pitching moment enhances an aircraft's stability. In some embodiments, this nose-down pitching moment opposes the nose-up pitching moment inherent in aircraft configured with low boom and/or low wave-drag wings and therefore enhances the overall stability of the aircraft.

A greater understanding of the wing discussed above may be obtained through a review of the illustrations accompanying this application together with a review of the detailed description that follows.

FIG. 1 is a fragmentary, schematic, overhead view of an aircraft 20, including a fuselage 21, equipped with a prior art wing 22. Prior art wing 22 has a leading-edge 24, a wingtip 26, and a trailing edge 28. Prior art wing 22 has a swept-back configuration, meaning that leading-edge 24 extends both in an outboard direction and an aft direction. In the illustrated embodiment, leading-edge 24 has a sweep angle of $\Lambda$. In other embodiments, $\Lambda$ may have a greater or lesser magnitude without departing from the teachings of the present disclosure. A swept-back configuration provides aerodynamic advantages to a supersonic aircraft. Although the context for the discussion contained herein is with respect to supersonic aircraft, it should be understood that the teachings disclosed herein are not limited for use solely with supersonic aircraft but instead may be employed by any type of fixed wing aircraft including, but not limited to, aircraft designed to fly exclusively at sub-sonic speeds, aircraft designed to fly at transonic speeds, aircraft designed to fly at supersonic speeds, and aircraft designed to fly at greater than supersonic speeds. Furthermore, the invention disclosed herein is not limited for use only on aircraft but may also be suitable and advantageous for use on other types of vehicles as well. For example, and without limitation, spacecraft that return to earth by flying or gliding through the earth's atmosphere may also employ the teachings disclosed herein. Applications to other types of vehicles are also possible.

Aircraft 20 has a center of gravity 30 which, in the illustrated embodiment, passes through fuselage 21 and a portion of prior art wing 22. As aircraft 20 flies through a freestream, it is oriented at an angle of attack $\alpha$ with respect to the direction of the freestream. As explained in greater detail below, leading-edge 24 will generate a leading-edge vortex (see FIGS. 3-9) when aircraft 20 is flown at sub-sonic speeds when certain factors coincide. Factors that contribute to the generation of a leading-edge vortex include the leading-edge sweep angle $\Lambda$, the thickness or radius of curvature of the leading-edge, and the angle of attack $\alpha$.

These three variables are interrelated. For example, at a predetermined angle of attack $\alpha$, the leading-edge thickness and the leading-edge sweep angle $\Lambda$ will cooperate to produce a leading-edge vortex. If the angle of attack $\alpha$ were to remain constant but the leading-edge sweep angle A were to be decreased (meaning that the wing is moved such that wingtip is positioned further away from the fuselage), the leading-edge thickness would need to be decreased in order to continue generating a leading-edge vortex. Conversely, if the angle of attack $\alpha$ were to remain constant, and the leading-edge thickness were to be increased (meaning that the leading edge of the wing was made thicker or given a larger radius of curvature), the leading-edge sweep angle would need to be increased (meaning that the wingtip would need to move closer to the fuselage) in order to continue generating a leading-edge vortex. Similarly, for a predetermined leading-edge sweep angle and a predetermined leading-edge thickness, a leading-edge vortex arises when the angle of attack $\alpha$ reaches a sufficiently large magnitude. If the angle of attack $\alpha$ is increased sufficiently beyond the point where the leading-edge vortex is initially generated, then the leading-edge vortex will detach from the leading-edge and will begin to sweep in an aft direction as the angle of attack $\alpha$ continues to increase. The generation of a leading-edge vortex will be further explained below.

Figure 2:
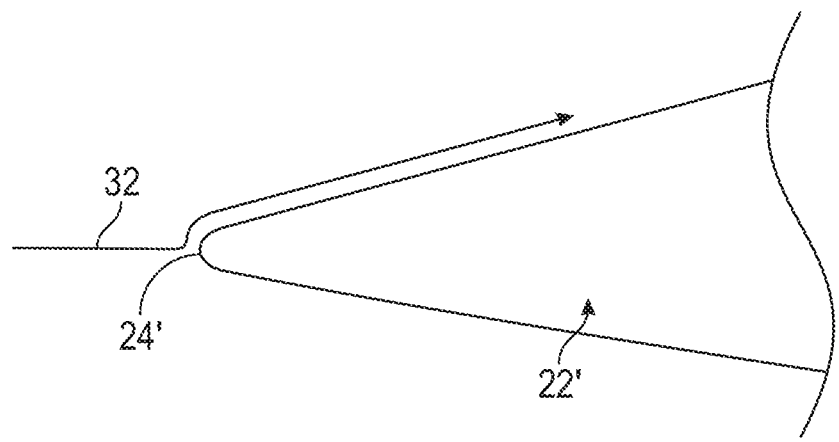
FIG. 2. is a cross-sectional view taken along the line 2-2 of FIG. 1 illustrating alternate embodiments of a wing leading-edge flown at a first angle of attack.
Figure 2:
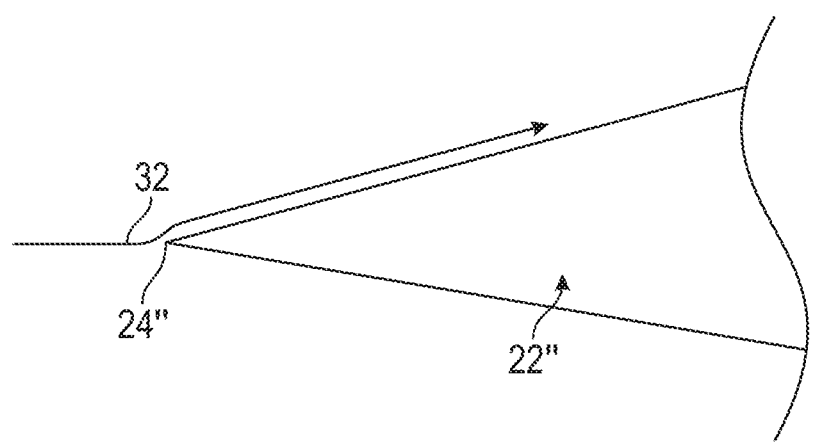
Figure 3:
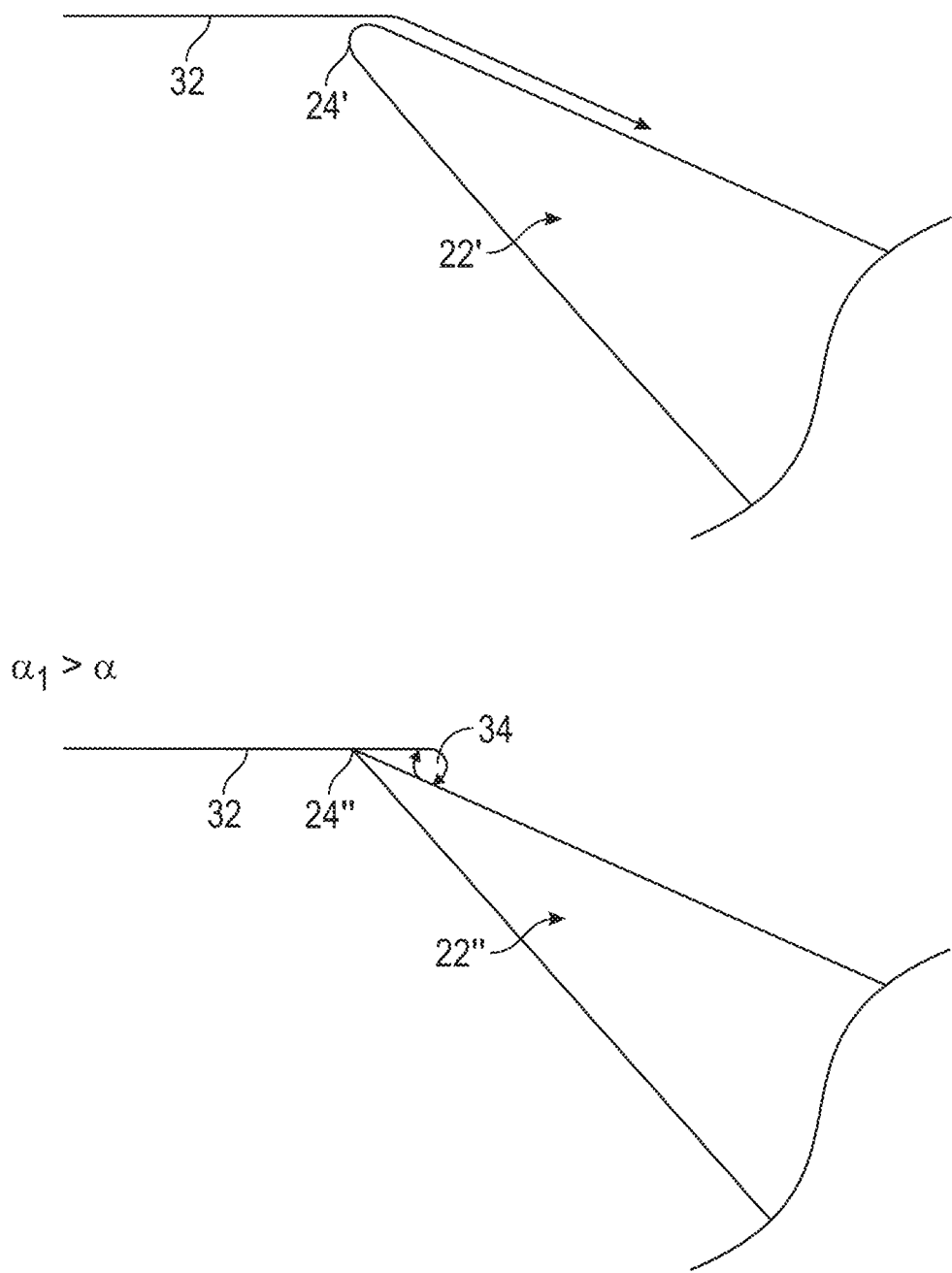
FIG. 3. is a cross-sectional view taken along the line 2-2 of FIG. 1 illustrating the alternate embodiments of the wing leading-edge flown at a second angle of attack.
Figure 4:
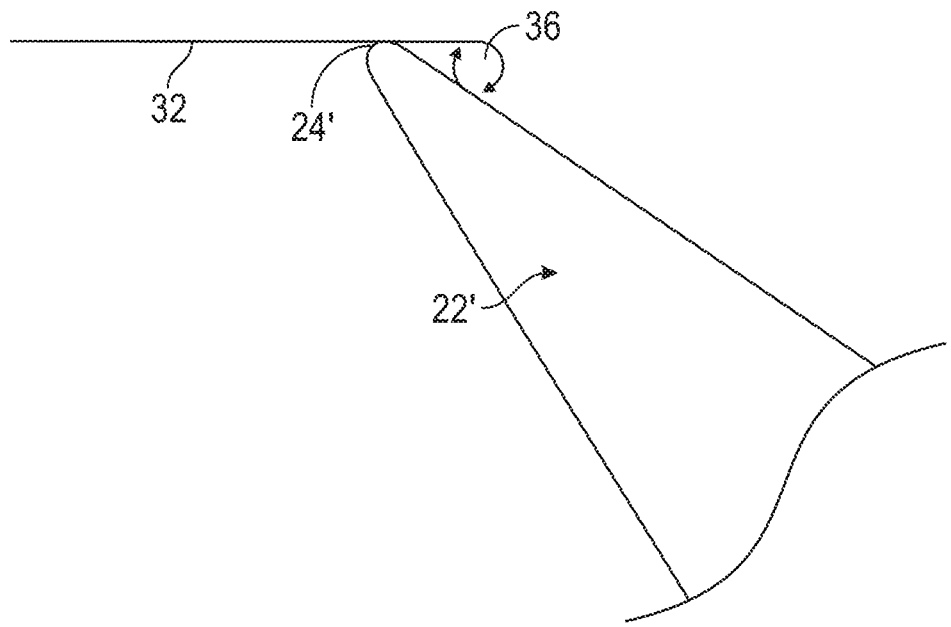
FIG. 4. is a cross-sectional view taken along the line 2-2 of FIG. 1 illustrating the alternate embodiments of the wing leading-edge flown at a third angle of attack.
Figure 4:
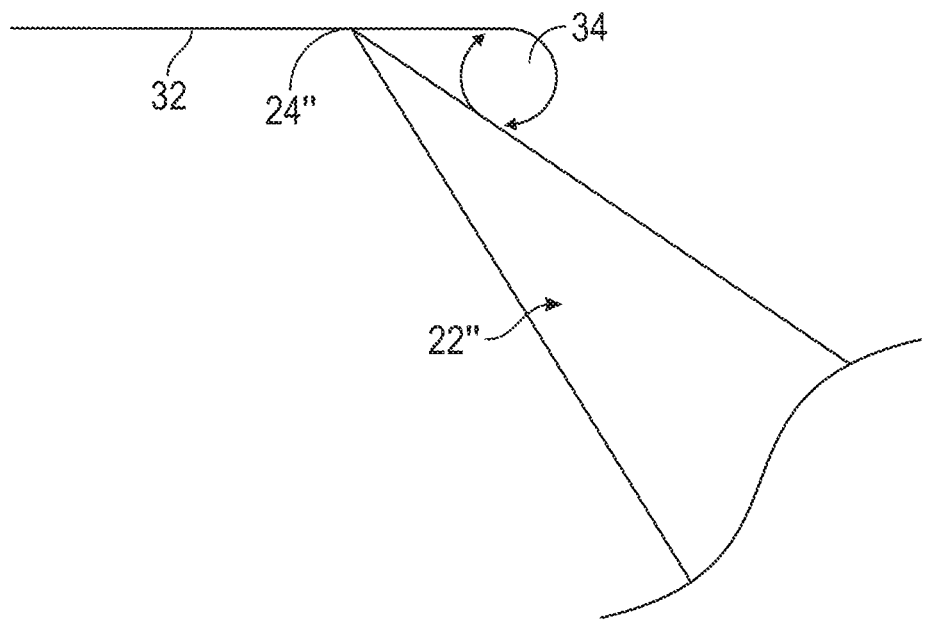

FIGS. 2-4 are fragmentary cross-sectional views taken along the line 2-2 of FIG. 1 and illustrate two alternate embodiments of prior art wing 22, those being a prior art wing 22' and a prior art wing 22". Prior art wing 22' has a leading-edge 24' and prior art wing 22" has a leading-edge 24". As is apparent from the illustration, leading-edge 24' has a greater thickness or radius than leading-edge 24", a distinction that will produce differing results, as explained below.

FIG. 2 further illustrates a freestream 32 as it encounters prior art wings 22' and 22". As freestream 32 encounters leading-edges 24' and 24", the freestream must deviate from its existing path to a new path that follows the contours of prior art wings 22' and 22". In FIG. 2, aircraft 20 is moving through the freestream at an angle of attack $\alpha$ of zero degrees. When the angle of attack $\alpha$ is zero degrees, freestream 32 does not need to deviate substantially from its initial direction in order to follow the contours of prior art wings 22' and 22". Thus, at an angle of attack α of zero degrees, freestream 32 remains attached to the upper surfaces of prior art wings 22' and 22", no flow separation occurs, and no leading-edge vortex is generated.

In FIG. 3, prior art wings 22' and 22" are oriented at an angle of attack of $α_1$ which is greater than α. When the angle of attack is greater than zero degrees, the freestream must turn as it passes the wing's leading-edge in order to remain attached to the downstream upper surface of the wing. The wider the turn is at the leading-edge, the more likely the freestream will be able to remain attached to the wing's upper surface. The sharper the turn is around the leading-edge, the more likely the freestream will be to shear off and become detached from the leading-edge. This is illustrated in FIG. 3, where freestream 32 is able to turn around leading-edge 24' and remain attached to the upper surface of prior art wing 22', but is not able to turn around leading-edge 24" and shears off. As the freestream shears off and passes leading-edge 24", a vacuum-like low pressure region forms just aft of leading-edge 24' which cause freestream 32 to turn back towards the upper surface of prior art wing 22" and then to continue turning until it is moving forward (as indicated by the cyclical arrows) towards leading-edge 24". When this happens, a leading-edge vortex 34 is formed.

In FIG. 4, prior art wings 22' and 22" are oriented at an angle of attack of $α_2$ which is greater than $α_1$. At an angle of attack of $α_2$, freestream 32 is no longer able to turn around leading-edge 24' of prior art wing 22'. Rather, it shears off and then turns back toward the upper surface of prior art wing 22' due to the resulting low pressure region and then begins to move in a forward direction and forms leading-edge vortex 36. With respect to prior art wing 22", due to the higher angle of attack, freestream 32 shears off at a higher angle with respect to the upper surface of prior art wing 22" and moves further past prior art wing 22" than it did when the angle of attack was merely $α_1$ before turning back towards the upper surface of prior art wing 22" due to the resulting low pressure region. As a result, leading edge vortex 34 has grown in diameter as compared with FIG. 3. If the angle of attack were to continue to increase, leading-edge vortex 34 would continue to grow and eventually "detach" from the leading-edge and begin to migrate aft along the upper surface of prior art wing 22".

Figure 5:
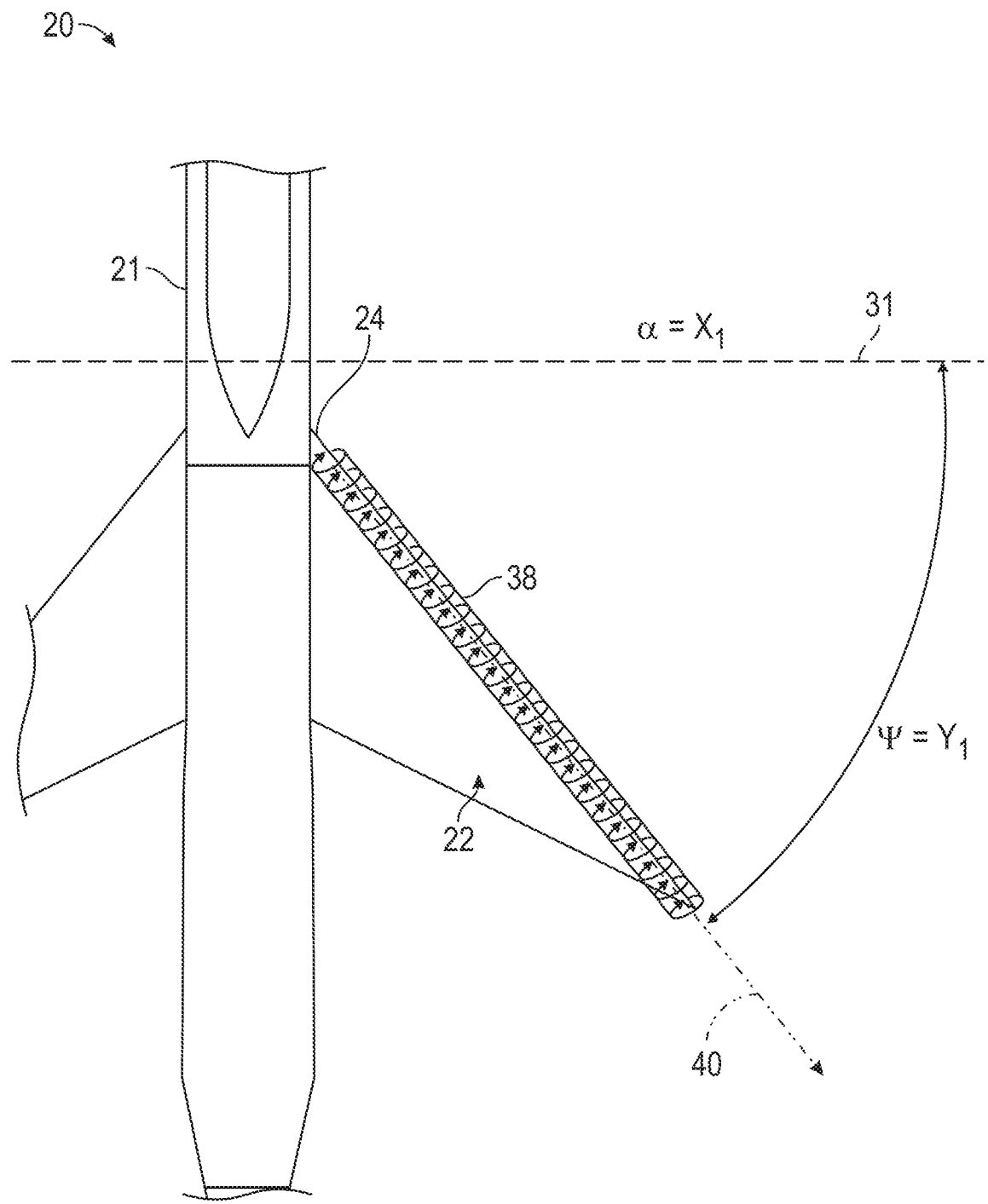
FIG. 5 is a fragmentary schematic overhead view illustrating the aircraft of FIG. 1 flown at a first angle of attack that yields a vortex that remains attached to the leading-edge of the prior art wing.

FIG. 5 is a fragmentary, schematic, overhead view illustrating aircraft 20 flying sub-sonically at an angle of attack α of $X_1$ degrees. In the illustrated embodiment, an angle of attack α of $X_1$ degrees is just steep enough to cause a leading-edge vortex 38 to form along leading-edge 24. In some non-limiting embodiments, an angle of attack α of $X_1$ degrees may comprise a subsonic cruise angle of attack.

In physical terms, leading-edge vortex 38 is similar to a tornado, but one that is oriented horizontally. Leading-edge vortex 38 has an axis 40 which passes through the center of leading-edge vortex 38 and which, in FIG. 5, is substantially aligned with leading-edge 24. When aircraft 20 flies at an angle of attack α of $X_1$ degrees, axis 40 is oriented at an angle Ψ of $Y_1$ degrees with respect to transverse axis 31. So long as aircraft 20 is flown sub-sonically at angle of attack α of $X_1$ degrees, then axis 40 will remain oriented at an angle of Ψ of $Y_1$ and leading-edge vortex 38 will remain attached to, and aligned with, leading-edge 24.

Because, as discussed above, leading-edge vortex 38 is formed by shearing off the freestream and separating it from the upper surface of prior art wing 22, a vacuum-like low pressure region forms beneath leading-edge vortex 38. This low pressure region exerts a suction on the upper surface of prior art wing 22 beneath the entire length of leading-edge vortex 38. The strength of this suction may vary from location to location along the length of leading-edge vortex 38.

Figure 6:
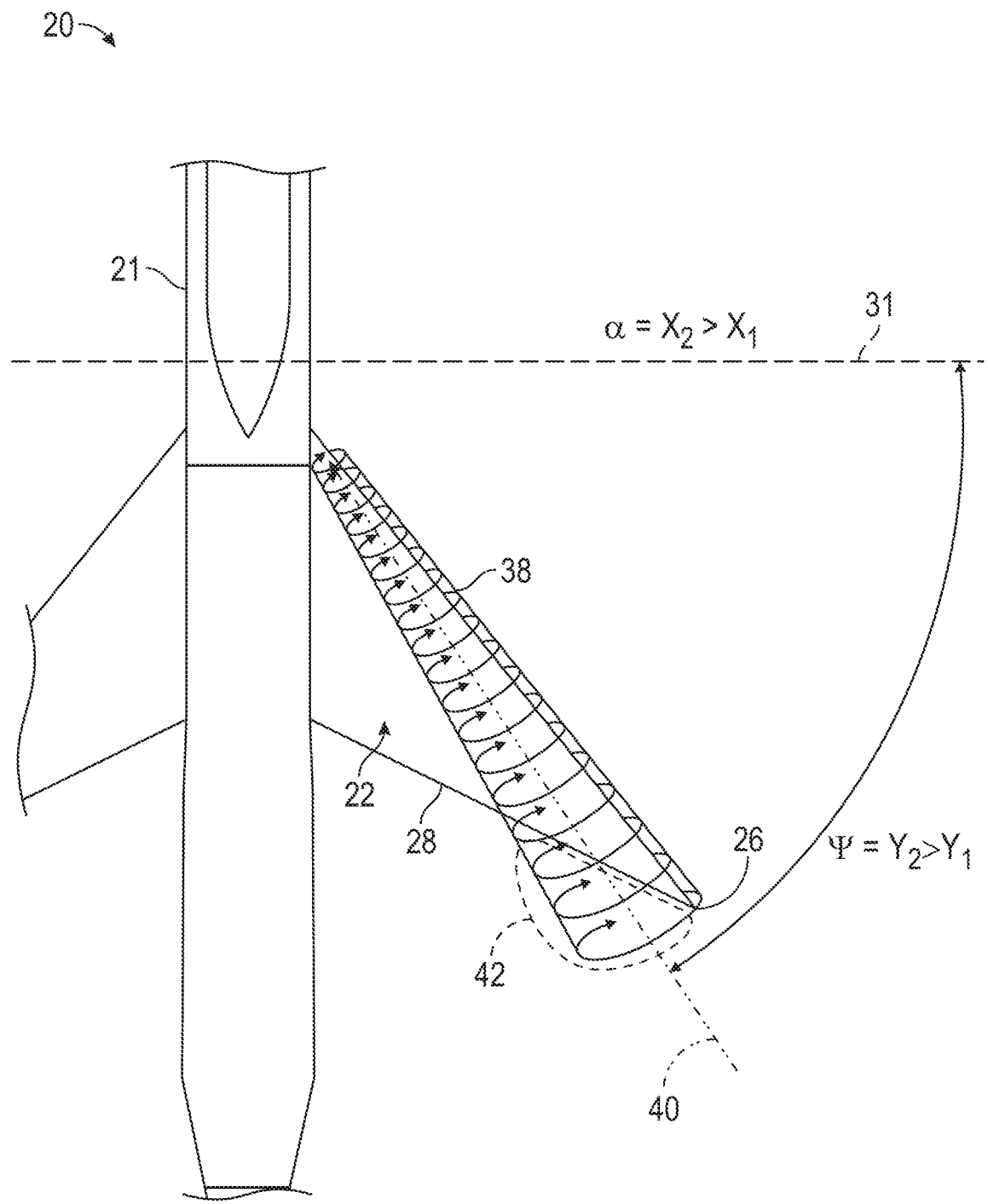
FIG. 6 is a fragmentary schematic overhead view illustrating the aircraft of FIG. 5 flown at a second angle of attack greater than the first angle of attack, the second angle of attack causing the vortex to detach from the leading-edge and to relocate to an aft position on the prior art wing.

FIG. 6 is a fragmentary, schematic, overhead view illustrating aircraft 20 flying sub-sonically at an increased angle of attack as compared with the angle of attack of aircraft 20 in FIG. 5. In FIG. 6, aircraft 20 is now flying at an angle of attack α of $X_2$ degrees ($X_2$ degrees is greater than $X_1$ degrees). In some non-limiting embodiments, an angle of attack α of $X_2$ degrees may correspond with a transitional angle of attack occupied by aircraft 20 as aircraft 20 transitions from a sub-sonic cruise condition to a landing orientation.

As a result of this increased angle of attack, leading-edge vortex 38 has grown in diameter and has begun to "detach" from leading-edge 24, meaning that axis 40 has begun to swing clockwise (the clockwise direction being assessed from the perspective of FIG. 6) in an aft direction. The inception point of a vortex on a highly swept wing planform with a sharp leading edge is fixed near the apex of the wing. As the angle of attack increases, the vortex will grow in size, but because the inception point is invariant, the vortex "rotates" about the inception point in an aft direction along the wing rather than translating.

In FIG. 6, axis 40 is now oriented at an angle Ψ of $Y_2$ degrees with respect to transverse axis 31 ($Y_2$ degrees is greater than $Y_1$ degrees). As a result of this new orientation of leading-edge vortex 38, axis 40 now extends over trailing edge 28 at a location inboard of wingtip 26. Consequently, a portion 42 of leading-edge vortex 38 now passes over, and extends beyond, trailing edge 28 at a location inboard of wingtip 26. Correspondingly, the vacuum-like low pressure region beneath portion 42 also resides beyond trailing edge 28 at a location inboard of wingtip 26. This means that the vacuum-like low pressure region beneath portion 42 cannot interact with the upper surface of prior art wing 22.

Figure 7:
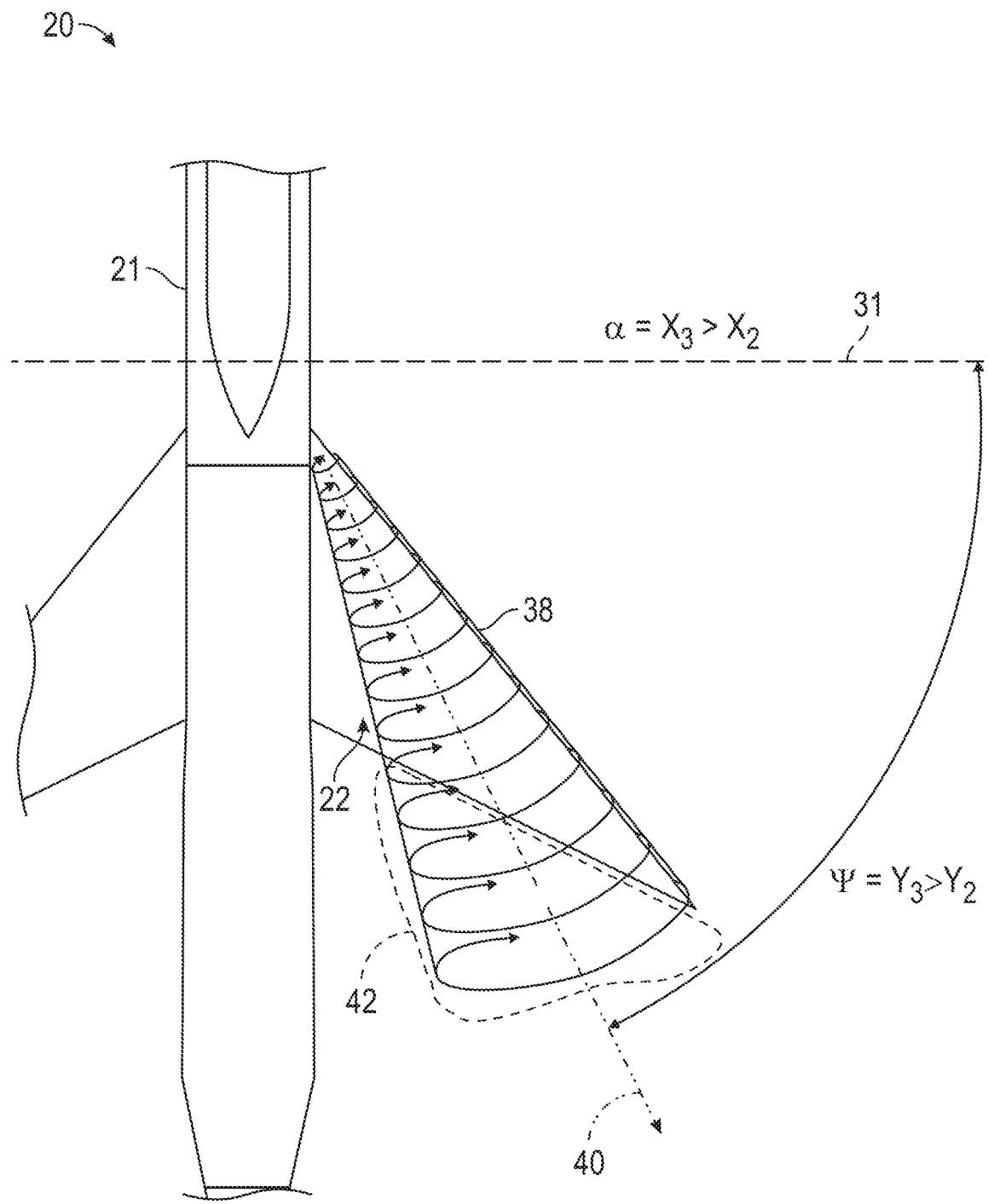
FIG. 7 is a fragmentary schematic overhead view illustrating the aircraft of FIG. 6 flown at a third angle of attack greater than the second angle of attack, the third angle of attack corresponding with a design condition angle of attack that causes the vortex to relocate to a further aft position on the prior art wing.

FIG. 7 is a fragmentary, schematic, overhead view illustrating aircraft 20 flying sub-sonically at a further increased angle of attack as compared with the angle of attack of aircraft 20 in FIG. 6. In FIG. 7, aircraft 20 is now flying at an angle of attack α of $X_3$ degrees ($X_3$ degrees is greater than $X_2$ degrees). In some non-limiting embodiments, an angle of attack α of $X_3$ degrees may correspond with an angle of attack flown by aircraft 20 during a landing phase of its flight profile.

As a result of this further increased angle of attack, leading-edge vortex 38 has grown even further in diameter and has swung even further clockwise (the clockwise direction being assessed from the perspective of FIG. 7) in an aft direction than the diameter and clockwise rotation illustrated in FIG. 6. In FIG. 7, axis 40 is now oriented at an angle Ψ of $Y_3$ degrees with respect to transverse axis 31 ($Y_3$ degrees is greater than $Y_2$ degrees). As a result of this new orientation of leading-edge vortex 38, axis 40 now extends over trailing edge 28 at a location further inboard of wingtip 26 than the location illustrated in FIG. 6. Consequently, portion 42 of leading-edge vortex 38 has moved further inboard and is now substantially larger than it was under the conditions discussed above with respect to in FIG. 6. The magnitude of the vacuum-like low pressure region beneath portion 42, which resides inboard of wingtip 26 and aft of trailing edge 28, has grown correspondingly. This constitutes a substantial amount of low pressure that that is being generated by leading-edge vortex 38, but which does not interact with the upper surface of prior art wing 22.

Figure 8:
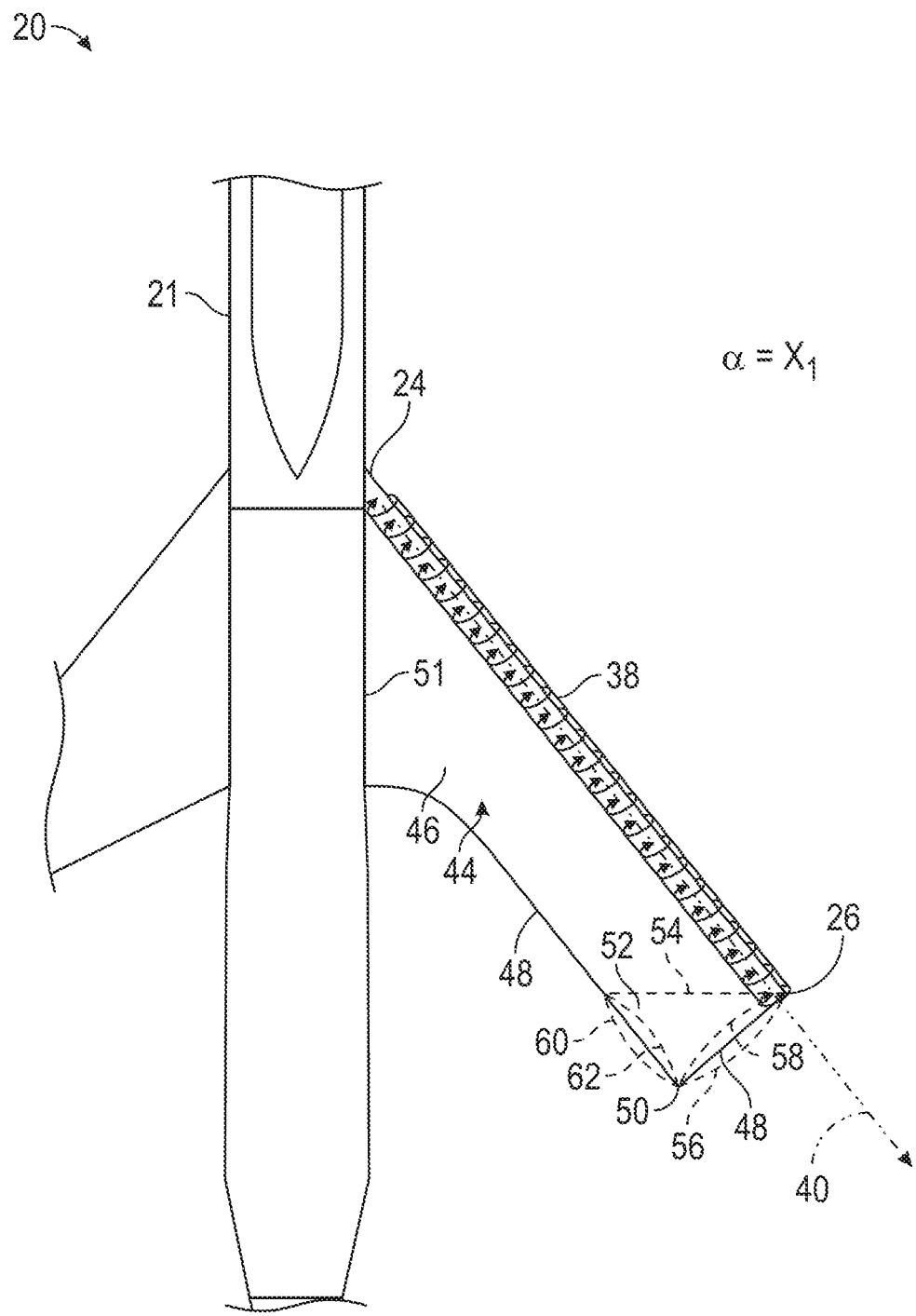
FIG. 8 is a fragmentary schematic overhead view illustrating an aircraft configured with a non-limiting embodiment of a wing made in accordance with the teachings of the present disclosure flown at the first angle of attack that yields the vortex that remains attached to the leading-edge.

FIG. 8 is a fragmentary, schematic, overhead view illustrating aircraft 20 equipped with a non-limiting embodiment of a wing 44 made in accordance with the teachings of the present disclosure. Wing 44 includes a wing body 46 having a leading-edge 24, a wing tip 26, and a trailing edge 48. With continuing reference to FIGS. 1-7, FIG. 8 illustrates that leading-edge 24 and wingtip 26 are largely unchanged with respect to prior art wing 22, but that trailing edge 48 differs from trailing edge 28. Moving inboard from wingtip 26, we see that trailing edge 48 no longer sweeps forward from wingtip 26 (as was the case with prior art wing 22), but rather, trailing edge 48 first sweeps in an aft direction until it reaches an aft-most portion 50 and then turns and sweeps in a forward direction. In some embodiments, aft-most portion 50 is disposed between fifty-five percent and eighty-five percent of a span of wing 44. In some embodiments, aft-most portion 50 is disposed outboard of a wing root 51.

As a result of this configuration, a wing portion 52 extends into a region of space that prior art wing 22 left vacant. Wing portion 52 is delineated at a forward end by a dotted line 54 and at an aft end by portions of trailing edge 48. Wing portion 52 provides an additional amount of wing surface area disposed directly beneath the path taken by leading-edge vortex 38 when it detaches from leading-edge 24 as the angle of attack increases. Being disposed aft of wingtip 26, wing portion 52 is positioned to interact with the low pressure region disposed beneath the portion of the leading-edge vortex that would normally extend aft beyond trailing edge 28 of prior art wing 22 when aircraft 20 increases its angle of attack.

In the illustrated embodiment, the portions of trailing edge 48 associated with wing portion 52 have been illustrated as having straight edges. It should be understood that those portions of trailing edge 48 need not be straight, but rather, may have any suitable curvature. For example, the portion of trailing edge disposed between wingtip 26 and aft-most portion 50 may have the curvature indicated by dotted line 56 or by dotted line 58, or it may have any other suitable curvature. Similarly, the portion of trailing edge 48 disposed between aft-most portion 50 and dotted line 54 may have the curvature indicated by dotted line 60 or by dotted line 62, or it may have any other suitable curvature. Additionally, in the illustrated embodiment, aft-most portion 50 is depicted as being a distinct point. However, it should be understood that, in other embodiments, aft-most portion 50 may comprises a segment that may have a straight or curved configuration without departing from the teachings disclosed herein.

In FIG. 8, aircraft 20 is oriented at an angle of attack α of $X_1$ degrees which, as discussed above, is just enough to generate a leading-edge vortex 56 that remains attached to leading-edge 24. As a result, axis 40 aligns with leading-edge 24 and passes directly over wingtip 26. Under these circumstances, there is no appreciable difference between the performance of wing 44 and prior art wing 22. Meaningful differences will not manifest between the performance of wing 44 and prior art wing 22 until aircraft 20 is flying higher angles of attack.

Figure 9:
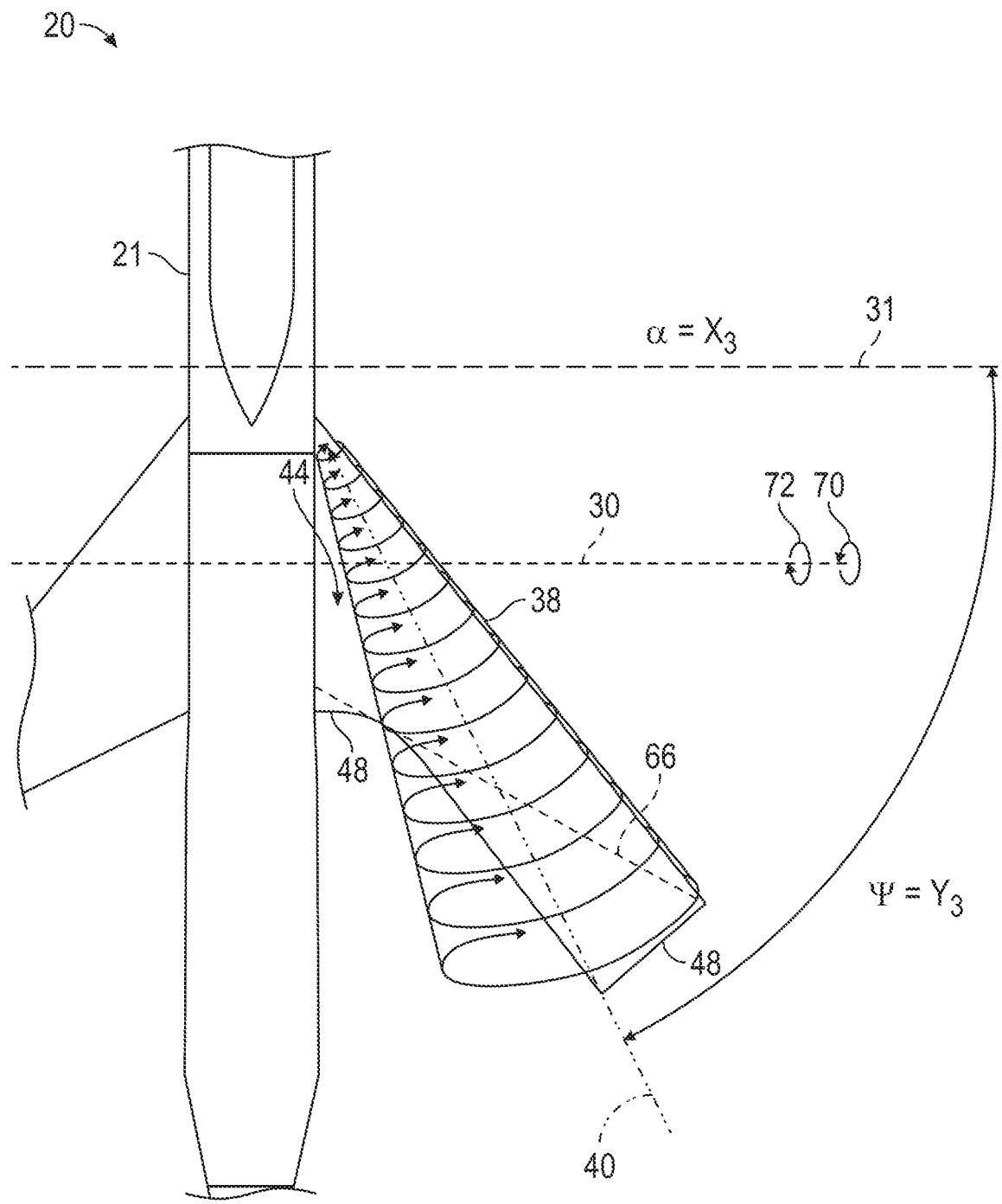
FIG. 9 is a fragmentary schematic overhead view illustrating the aircraft of FIG. 8 flown at the third angle of attack that corresponds with the design condition angle of attack and that causes the vortex to detach from the leading-edge and extend aft off of the trailing edge of the wing at a location inboard of the wingtip.

FIG. 9 is a fragmentary, schematic, overhead view illustrating aircraft 20 equipped with wing 44 flying at an angle of attack α of $X_3$ degrees. In the illustrated embodiment, an angle of attack α of $X_3$ degrees corresponds with the angle of attack flown by aircraft 20 during a landing phase of flight. Leading-edge vortex 38 has swung in a clockwise direction (the clockwise direction being assessed from the perspective of FIG. 9) such that axis 40 is now oriented at an angle Ψ of $Y_3$ degrees with respect to transverse axis 31. Axis 40 now extends in a direction that is further aft and further inboard of the axis 40 illustrated in FIG. 8. So long as aircraft 20 maintains an angle of attack α of $X_3$ degrees while flying sub-sonically, axis 40 will maintain an angle Ψ of $Y_3$ degrees.

In the illustrated embodiment, axis 40 passes directly over aft-most portion 50 when angle of attack α is $X_3$ degrees. In some embodiments, the location of aft-most portion 50 is designed and positioned to coincide with the location on trailing edge 28 where axis 40 will extend beyond trailing edge 48 while aircraft 20 is flown at a design condition angle of attack. With continuing reference to FIGS. 1-8, this configuration permits wing 44 to take full advantage of the low pressure region situated beneath portion 42 (see FIG. 7) of leading-edge vortex 38. Dotted line 66 illustrates where trailing edge 28 falls in comparison with trailing edge 48. As illustrated, while prior art wing 22 had no way to utilize the low pressure region beneath portion 42, wing body 46 includes wing portion 52 which is disposed directly under portion 42 and is therefore able to interact with the low pressure region beneath portion 42.

Interaction between the low pressure region beneath portion 42 and wing portion 52 gives rise to a moment tending to cause aircraft 20 to pitch nose down. This is because the low pressure region beneath portion 42 pulls in an upward direction on wing portion 52 and wing portion 52 is disposed aft of center of gravity 30. Aircraft 20 has a natural tendency to pitch nose up under the urging of moment 72 caused by other features of wing 44. By adding wing portion 52 to wing 44, moment 70 is able to offset or perhaps even completely counteract moment 72, which contributes to the stability of aircraft 20.

In other embodiments, aft-most portion 50 may be designed to coincide with the location where axis 40 extends beyond trailing edge 48 when aircraft 20 is flying at a design condition angle of attack α other than the angle of attack α associated with a landing phase-of flight. In some non-limiting embodiments, aft-most portion 50 may comprise a trailing edge segment having boundaries and/or internal locations that correspond with two or more different design condition angles of attack α, which may provide desirable moments 70 for a plurality of different phases of flight.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A wing for an aircraft, the wing comprising:
a wing body having a wingtip, a leading-edge, and a trailing edge,
wherein the wingtip comprises an outboard-most portion of the wing body,
wherein the leading-edge is disposed along a forward portion of the wing body and is configured to cause a vortex to extend off the trailing edge at a location inboard of the wingtip when the aircraft is flown sub-sonically at a predetermined angle of attack, and wherein the trailing edge is disposed along an aft portion of the wing body and has an aft-most region disposed inboard of the wingtip at a position that corresponds with the location inboard of the wingtip and wherein the trailing edge inboard of the aft-most region extends continuously upstream and includes at least one break.

2. The wing of claim 1, wherein the predetermined angle of attack comprises a design condition angle of attack.

3. The wing of claim 2, wherein the design condition angle of attack comprises an angle of attack to be flown by the aircraft during a landing phase of flight.

4. The wing of claim 1, further comprising a wing root disposed along an inboard portion of the wing, wherein the aft-most region is disposed outboard of the wing root.

5. A wing for an aircraft, the wing comprising:
a wing body having a wingtip, a leading-edge, and a trailing edge,
wherein the wingtip comprises an outboard-most portion of the wing,
wherein the leading-edge is disposed along a forward portion of the wing body and is configured such that when the aircraft is flown sub-sonically at a first predetermined angle of attack, a vortex will form at the leading-edge and create a low pressure region at a first location on an upper surface of the wing, and when the aircraft is flown sub-sonically at a second predetermined angle of attack greater than the first predetermined angle of attack, the vortex will be repositioned causing the low pressure region to move to a second location on the upper surface of the wing, the second location being aft and inboard of the first location, and
wherein the trailing edge is disposed along an aft portion of the wing body and has an aft-most region disposed inboard of the wingtip and at a position that corresponds with the second location and wherein the trailing edge inboard of the aft-most region extends continuously upstream and includes at least one break.

6. The wing of claim 5, wherein the leading-edge has a cross-sectional radius and a sweep that cooperate to cause the leading-edge to generate the vortex when the aircraft is flown at the first predetermined angle of attack.

7. The wing of claim 5, wherein the second predetermined angle of attack comprises a design condition angle of attack.

8. The wing of claim 7, wherein the design condition angle of attack comprises an angle of attack to be flown by the aircraft during a landing phase of flight.

9. The wing of claim 5, further comprising a wing root disposed along an inboard portion of the wing, wherein the aft-most region is disposed outboard of the wing root.

10. The wing of claim 5, wherein the aft-most region comprises an aft-most point.

11. The wing of claim 5, wherein the aft-most region is disposed between approximately fifty five percent and approximately eighty five percent of a span of the wing measured in an outboard direction from a root of the wing.

12. The wing of claim 5, wherein a portion of the trailing edge disposed inboard of the wingtip has a curved configuration.

13. The wing of claim 5, wherein the trailing edge has a forward sweep inboard of the aft-most region.

14. A wing for an aircraft, the wing comprising:
a wing body having a wingtip, a leading-edge, and a trailing edge,
wherein the wingtip comprises an outboard-most portion of the wing body;
wherein the leading-edge is disposed along a forward portion of the wing body and is configured such that when the aircraft is flown sub-sonically at a first predetermined angle of attack, a vortex will form at the leading-edge, the vortex having a vortex axis extending outboard in a first direction that is substantially aligned with the leading-edge when the aircraft is flown at the first predetermined angle of attack, and the vortex axis extending outboard in a second direction that is oblique with respect to the leading-edge and aft thereof when the aircraft is flown at a second predetermined angle of attack, the second predetermined angle of attack being greater than the first predetermined angle of attack; and
wherein the trailing edge is disposed along an aft portion of the wing body and has an aft-most region disposed inboard of the wingtip and at a position that corresponds with the vortex axis when the aircraft is flown at the second predetermined angle of attack and wherein the trailing edge inboard of the aft-most region extends continuously upstream and includes at least one break.

15. The wing of claim 14, wherein the second predetermined angle of attack comprises a design condition angle of attack.

16. The wing of claim 14, further comprising a wing root disposed along an inboard portion of the wing, wherein the aft-most region is disposed outboard of the wing root.

17. The wing of claim 14, wherein the aft-most region comprises an aft-most point.

18. The wing of claim 14, wherein the aft-most region is disposed between approximately fifty five percent and approximately eighty five percent of a span of the wing measured in an outboard direction from a root of the wing.

19. The wing of claim 14, wherein a portion of the trailing edge disposed inboard of the wingtip has a curved configuration.

20. The wing of claim 14, wherein the trailing edge has a forward sweep inboard of the aft-most region.

* * * * *